(12) United States Patent
Caigoy

(10) Patent No.: US 8,319,972 B2
(45) Date of Patent: Nov. 27, 2012

(54) PASSIVE REFLECTIVE TRACKING MEDIA COMPOSITIONS AND METHODS FOR COVERTLY TRACKING OBJECTS

(75) Inventor: Arturo L. Caigoy, Norco, CA (US)

(73) Assignee: Raytheon Company, Waltham, MA (US)

( * ) Notice: Subject to any disclaimer, the term of this patent is extended or adjusted under 35 U.S.C. 154(b) by 343 days.

(21) Appl. No.: 12/769,103

(22) Filed: Apr. 28, 2010

(65) Prior Publication Data

US 2011/0267618 A1    Nov. 3, 2011

(51) Int. Cl.
*G01N 21/55*    (2006.01)
(52) U.S. Cl. ........................................... 356/445
(58) Field of Classification Search .................. None
See application file for complete search history.

(56) References Cited

U.S. PATENT DOCUMENTS

| | | | |
|---|---|---|---|
| 2004/0119631 A1* | 6/2004 | Sanders et al. | 342/14 |
| 2006/0262389 A1 | 11/2006 | Zaczek | |
| 2008/0142734 A1* | 6/2008 | Forsyth et al. | 250/492.1 |

FOREIGN PATENT DOCUMENTS

| | | |
|---|---|---|
| EP | 1491921 A1 | 12/2004 |
| EP | 1607796 A1 | 12/2005 |
| EP | 1054271 A2 | 11/2010 |
| GB | 2345299 A | 7/2000 |
| WO | 2005089098 A2 | 9/2005 |
| WO | 2009070227 A1 | 6/2009 |

OTHER PUBLICATIONS

Search Report dated Jun. 16, 2011 of GB1102956.8 filed Feb. 21, 2011 (4 pages).
Macleod, H. A., "Thin Film Optical Filters", Adam Hilger Ltd., pp. 4-7 (1969).

* cited by examiner

*Primary Examiner* — Tu Nguyen
(74) *Attorney, Agent, or Firm* — Renner, Otto, Boisselle & Sklar, LLP

(57) ABSTRACT

A passive reflective tracking media includes a plurality of multi-layer particles including at least one layer of a high refractive index material and at least one layer of a low refractive index material. The particles are configured to reflect ambient electromagnetic radiation at one or more signature wavelengths. Methods of applying the tracking media to a target object, detecting the tracking media, and fabrication the tracking media are also described.

22 Claims, 10 Drawing Sheets

US 8,319,972 B2

PASSIVE REFLECTIVE TRACKING MEDIA COMPOSITIONS AND METHODS FOR COVERTLY TRACKING OBJECTS

BACKGROUND

This application generally relates to passive reflective tracking media compositions and methods for covertly tracking objects.

Surveillance of targets is important for many civilian and military objectives. Active locators, such as radio frequency (RF) transponders, have been used tracking targets. In addition, chemical taggants are also known, which use a chemical signature for detection and tracking purpose. These are complex systems and may be readily identified by their output (e.g., RF or chemicals).

SUMMARY

In an embodiment, a tracking media comprises: a plurality of multi-layer particles including at least one layer of a high refractive index material and at least one layer of a low refractive index material, wherein the particles are configured to reflect ambient electromagnetic radiation at one or more signature wavelengths.

In another embodiment, a method for applying a tracking media comprises applying the tracking media to a target object. And, a method for detecting the tracking media applied to a target object comprises using a detector configured to detect ambient electromagnetic radiation reflected from the tracking media.

In yet another embodiment, a method for forming the tracking media comprises: depositing at least one layer of a high refractive index material and at least one layer of a low refractive index material onto a substrate, and forming a plurality of particles from the deposited materials into the tracking media.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 5 shows a photo chemical vapor deposition apparatus and FIG. 6 shows an electron beam vapor deposition apparatus for forming the tracking media.

DETAILED DESCRIPTION

Figure 1:
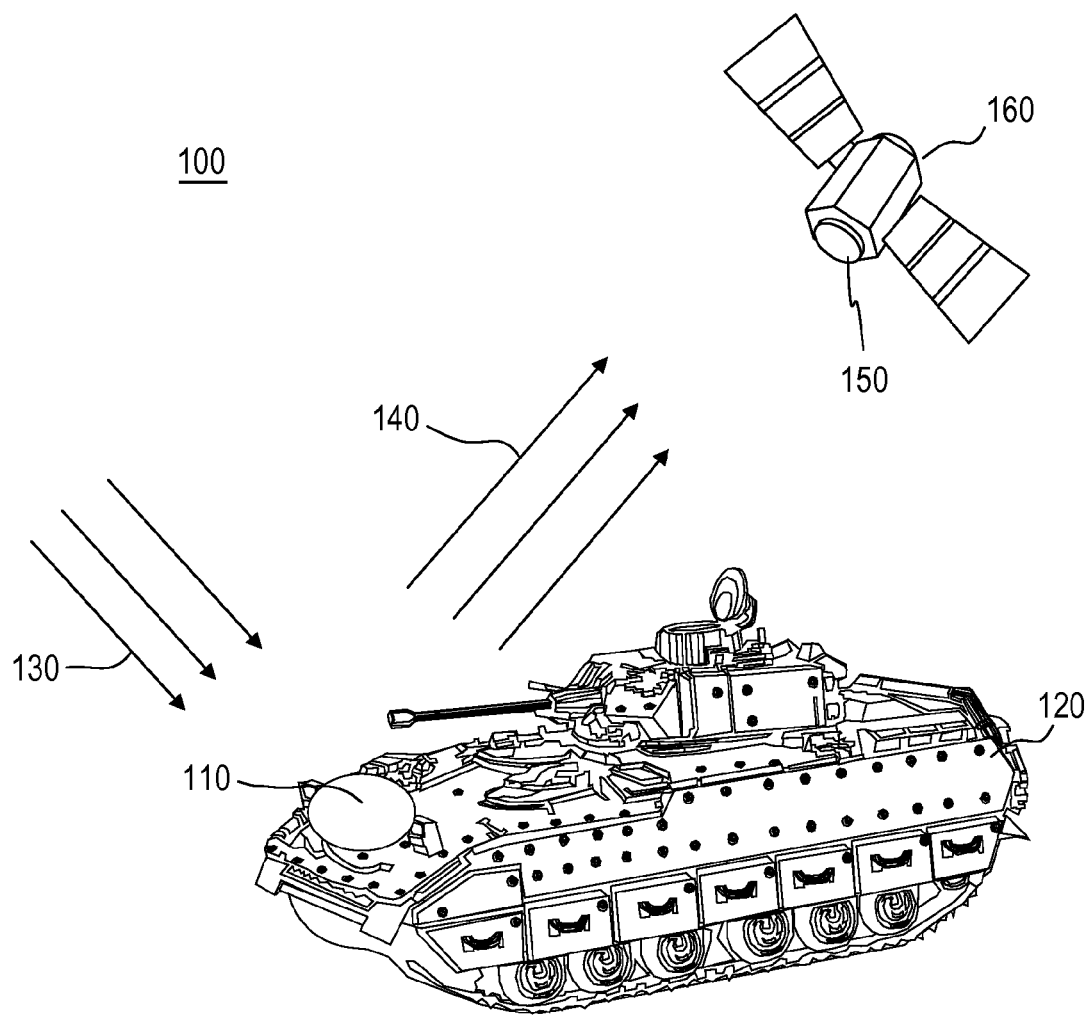
FIG. 1 shows an exemplary scenario for tracking target object in accordance with an embodiment, and FIG. 1A further shows detection of the reflected light in accordance with an embodiment.

According to various embodiments, passive reflective tracking media and methods for covertly tracking objects are described. The tracking media may include a plurality of multi-layer particles including at least one layer of a high refractive index material and at least one layer of a low reflective index material, wherein the particles are configured to reflect ambient electromagnetic radiation at one or more signature wavelengths.

The interface(s) between the high and low refractive index material layers affects the reflectance of the incident light. See, e.g., H. A. Macleod, "Thin-Film Optical Filters" Adam Hilger Ltd. (1969), pp. 4-7, herein incorporated by reference. According to an aspect of this disclosure, this interference phenomenon may be selectively configured to reflect ambient light at a characteristic reflectance wavelength.

As used herein, a "high refractive index" material means a material having an index of refraction of about 1.6 or greater. And, conversely, a "low refractive index" material means a material having an index of refraction of less than about 1.6.

By selectively changing the composition of materials used to form the particles and/or one or more properties thereof, the particles may be configured to selectively reflect ambient light at a particular wavelength. In one implementation, the tracking media may include differently configured particles that reflect ambient electromagnetic (light) at different wavelengths.

Ambient lighting may include, for instance, sun light, moon light, and/or man-made and artificial lighting, where present. Ambient electromagnetic (light) striking the particles is generally reflected approximately 180 degrees from the surface of a particle. Ambient lighting and/or reflected electromagnetic radiation (light) may include (UV), visible, and infrared (IR) spectrums. The reflected wavelength(s) may be, for example, in the visible spectra (i.e., about 390-700 nm) and include one or more of wavelengths of: 400 nm, 450 nm, 500 nm, 550 nm, and 600 nm. Of course, other wavelengths may also be reflected as desired.

Table I, below, includes some exemplary high and low refractive index materials which may be used for forming the tracking and their nominal refractive indices and transparency. These materials are not limiting. Other materials may also be used.

TABLE I

Characteristics of some thin-film materials

| Material | Refractive index | Region of transparency |
|---|---|---|
| Aluminum oxide ($Al_2O_3$) | 1.62 at 0.6 µm | |
| | 1.59 at 1.6 µm, substrate temperature 350° C. | |
| | 1.59 at 0.6 µm | |
| | 1.56 at 1.6 µm, | |

TABLE I-continued

Characteristics of some thin-film materials

| Material | Refractive index | Region of transparency |
|---|---|---|
| | substrate temperature 40° C. | |
| Antimony trioxide (Sb₂O₃) | 2.29 at 366 nm 2.04 at 546 nm | 300 nm->1 µm |
| Antimony sulphide (Sb₂S₃) | 3.0 at 589 nm | 500 nm-10 µm |
| Bismuth(III) oxide (Bi₂O₃) | 2.45 at 550 nm | |
| Cadmium sulphide (CdS) | 2.6 at 600 nm 2.7 at 700 nm | 600 nm-7 µm |
| Cadmium telluride (CdTe) | 3 · 05 in near infra-red | |
| Calcium fluoride (CaF₂) | 1.23-1.26 at 546 nm | 150 nm-12 µm |
| Ceric oxide (CeO₂) | 2.2 at 550 nm 2.18 at 550 nm, Substrate temperature 50° C. 2.42 at 550 nm, Substrate temperature 350° C. 2.2 in near infra-red | 400 nm-16 µm |
| Cerous fluoride (CeF₃) | 1.63 at 550 nm 1.59 at 200 nm | 300 nm->5 µm |
| Chiolite (5NaF•3AlF₃) | | |
| Cryolite (Na₃AlF₃) | 1.35 at 550 nm | <200 nm-14 µm |
| Germanium (Ge) | 4.0 | 1.7-100 µm |
| Lanthanum fluoride (LaF₃) | 1.59 at 550 nm 1.57 at 2.0 µm | 220 nm->2 µm |
| Lanthanum oxide (La₂O₃) | 1.95 at 550 nm 1.86 at 2.0 µm | 350 nm->2 µm |
| Lead(II) chloride (PbCl₂) | 2.3 at 550 nm 2.0 at 10 µm | 300 nm->14 µm |
| Lead fluoride (PbF₃) | 1.75 at 550 nm 1.70 at 1 µm | 240 nm-20> µm |
| Lead silicate (3PbO₂SiO₂) | 2.00-2.02 | Visible region |
| Lead telluride (PbT) | 5.5 | 3.4 µm-30 µm |
| Lithium fluoride (LiF) | 1.36-1.37 at 546 nm | 110 nm-7 µm |
| Magnesium fluoride (MgF₃) | 1.38 at 550 nm 1.35 at 2 µm | 210 nm-10 µm |
| Neodymium fluoride (NdF₃) | 1.60 at 550 nm 1.58 at 2 µm | 220 nm->2 µm |
| Neodymium oxide (Nd₂O₂) | 2.0 at 550 nm 1.95 at 2 µm | 400 nm->2 µm |
| Praseodymium oxide (Pr₃O₂) | 1.92 at 550 nm 1.83 at 2 µm | 400 nm->2 µm |
| Silicon (Si) | 3.5 | 1.1-10 µm |
| Silicon monoxide (SiO) | 2.0 at 550 nm 1.7 at 6 µm | 500 nm-8 µm |
| DiSilicon trioxide (Si₂O₂) | 1.52-1.55 at 550 nm | 300 nm-8 µm |
| Silicon dioxide (SiO₂) | 1.46 at 550 nm 1.445 at 1.6 µm | <200 nm-8 µm (in thin films) |
| sodium fluoride (NaF) | 1.34 visible | <250 nm-14 µm |
| Tellurium (Te) | 4.9 at 6 µm | 3.4-20 µm |
| Titanium dioxide (TiO₂) | 2.2-2.7 at 550 nm depending on structure | 350 nm-12 nm |
| Thallous chloride (TlCl) | 2.6 at 12 µm | Visible region->20 µm |
| Thorium oxide (ThO₂) | 1.8 at 550 nm 1.75 at 2.0 µm | 250 nm->2 µm |
| Thorium fluoride (ThF₄) | 1.52 at 400 nm 1.51 at 750 nm | 200 nm->15 µm |
| Zinc selenide (ZnSe) | 2.58 at 633 nm | 600 nm->15 µm |
| Zinc Sulphide (ZnS) | 2.35 at 550 nm 2.2 at 2.0 µm | 380 nm-approx. 25 µm |
| Zirconium oxide (ZrO₂) | 2.1 at 550 nm 2.0 at 2.0 µm | |

For convert tracking purposes, particles may be formed having nominal dimensions of about ¹⁄₁₆th of an inch or less. For example, the tracking media may be fabricated into small particles, having nominal dimensions of approximately 0.001 in.×0.001 in.×0.00001 in. (for rectangular particles), or a diameter of about 0.001 inch (for spherical or hemispherical particles). In some instances, the particles may appear as a fine dust or powder.

For applications in which stealth is not necessary and the tracking media is intended to be readily apparent, such as, for example, mitigating friendly fire, or identifying "friends" or "foes," the tracking media may be used without size limitations.

The particles may be mixed with other materials to form tracking media. The tracking media may be configured in many forms, including, but not necessarily limited to: gels, sprays, mists, aerosols, adhesives, coating, stickers, paints, powders, flakes, etc. In one implementation, the tracking media may be configured as a projectile. The projectile may be configured to be rupture upon impact to apply the tracking media to the target object. For instance, the projectile may be configured as a gel capsule, similar to a "paint ball," which may be fired from a rifle or air gun.

The tracking media may be used in different combinations and forms. For instance, the tracking media may be mixed with an adhesive and encapsulated in a gel ball. The adhesive may provide a clear, matte finish coating when dried. The tracking media may be applied to various vehicles (e.g., civilian and military), containers, persons, animals, and/or other targets for surveillance. In some implementations, the tracking media may provide high reflectance and be transparent to light. For instance, it may have a reflectance of about 95% or more, and may be about 90% or more transparent to the ambient light.

Once applied, the reflected light from the tracking media may then be detected and/or tracked using a detector. Detectors may include various photodetector sensors or devices which are configured to detect electromagnetic radiation (light), such as, for example, photodiodes, phototransistors, photoresistors, photovoltaic cells, charge couple devices (CCD), or other light detecting devices. The detectors may be a satellite-based, aircraft-based or ground-based detector. In some implementations, the tracking media may be tracked using a hyper-spectral imaging (HSI) system, as described, for example, in U.S. Pat. Nos. 7,080,912; 6,008,492, and 5,260,767, herein incorporated by reference in their entireties.

Physical filtering and/or processing (by a processor associated with the detector) may be used to discriminate, characterize and/or identify one or more signature wavelengths. Since different tracking media may be used, the detector may be configured to know what target is being tracked. For instance, a look-up table, in memory, may associate various reflectance signatures with corresponding targets.

FIG. 1 shows exemplary scenario 100 for tracking a target object in accordance with an embodiment.

Tracking media 110, having been previous applied to target object 120, may be detected and subsequently tracked. As shown, target object 120 may be a tank. However, various other types of target objects, such as civilian targets, may similarly be tracked.

In one implementation, tracking media 110 may be generally transparent when mixed with a transparent coating material that dries in a matte and/or waterproof finish. Thus, once applied to target object 120, for instance, it may be very different to difficult to detect with the "naked eye," or it may appear as something entirely different. For example, tracking media 110 may resemble bird droppings, dried mud or caked-on dirt, debris, etc., when applied. Preferably, tracking media 110 may go virtually undetected. And, if detected, it will not be readily identified as a tracking device. Persons thus, may not readily recognize that target object 120 is under surveillance. As such, tracking media 110 may provide a certain degree of covertness and/or stealth.

Ambient lighting or other illumination 130 strikes tracking media 110 and is reflected. Reflected light 140 has a specific or characteristic reflectance signature which may be detected. Some of reflected light 140 will be received by detector 150. Detector 150 may be configured detect the specific signature. As such, light reflected from target object 120 may be detected. In the implementation shown, detector 150 may be located on satellite 160. Note, for clarity, light other than light directed toward target object 120 and reflected toward detector 150 has been omitted.

Figure 1A:
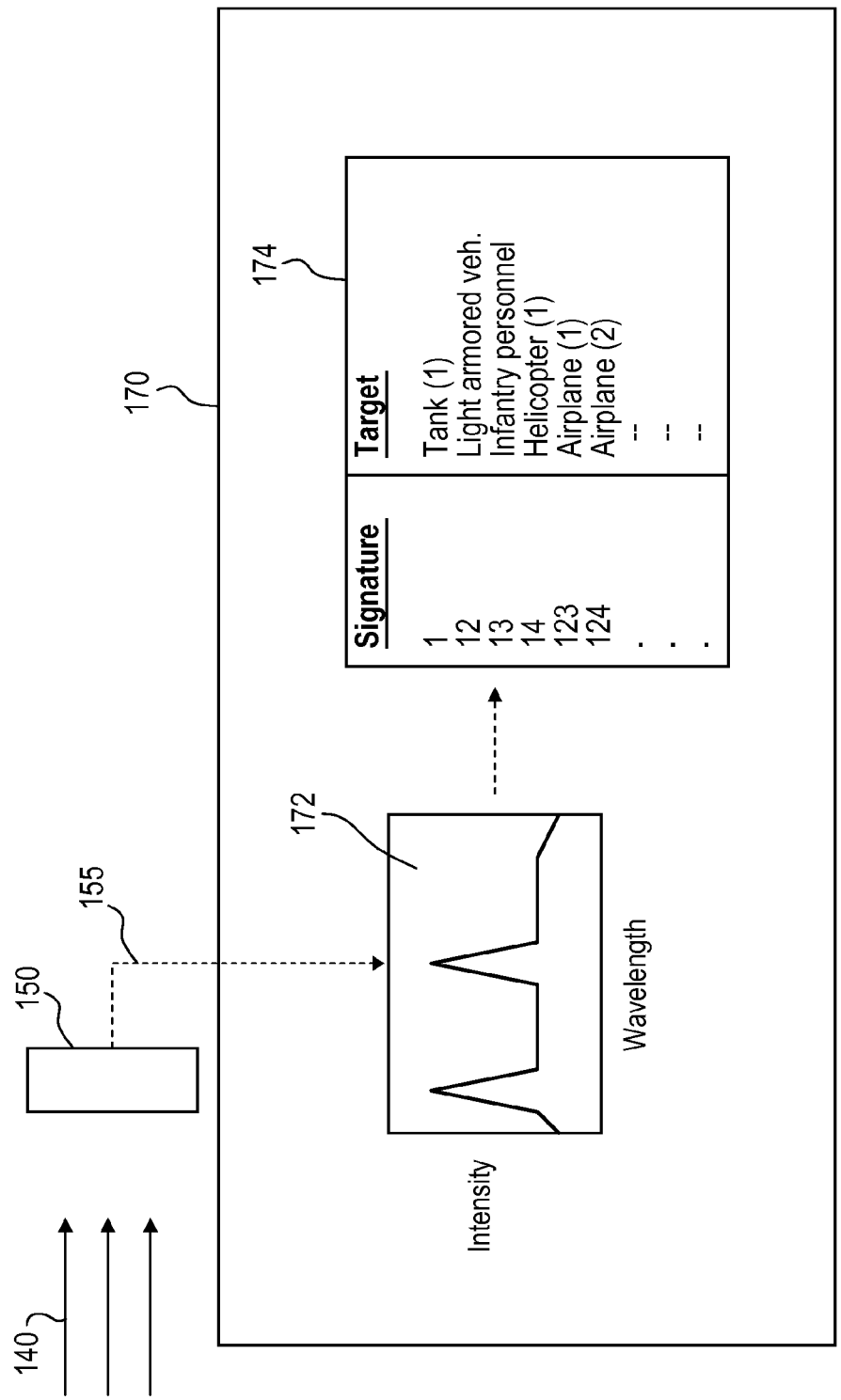

FIG. 1A further shows detection of reflected light 140 in accordance with an embodiment. Detector 150 receives reflected light 140, and generates signal 155. Spectra 172 may be generated based on signal 155, with or without processing (depending on detector 150). As shown, spectra may include intensity values as a function of wavelength. Processor 170 analyzes spectra 172 to determine one or more of its characteristic. For instance, various curve fitting or analyzing functions, as known in the art, may be used to characterize spectra 172. Lookup table 174 may be used to identify a target for a given signature corresponding to a particular tracking media 110 composition as further described herein.

Additionally or alternatively, a person might also be able to "eye-ball" spectra 172 and be able to determine a given signature as well.

Figure 2A:
FIGS. 2A-2C show exemplary tracking media particles in accordance with various embodiments.
Figure 2B:
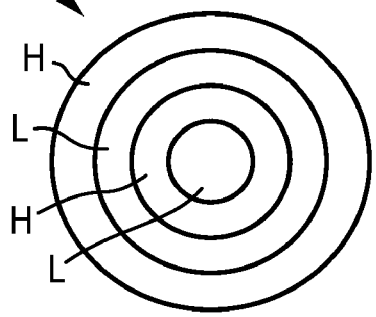
Figure 2C:
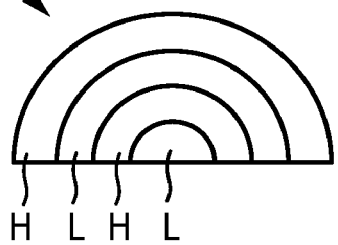

FIGS. 2A-2C show exemplary tracking media particles 200a, 200b, 200c in accordance with various embodiments.

Tracking media may be comprised of alternating layers of a high refractive index material H and a low refractive index material L. In one instance, 10-12 layers (i.e., 5-6 alternating layers each of the high H and low L refractive index materials) may be used to form particles of the tracking media. In other implementations, more or less layers may also be provided.

In one embodiment, the high refractive index material H may be lead silicate ($3PbO_2SiO_2$) and the low refractive index material L may be silicon dioxide ($SiO_2$). Of course, these specific materials are exemplary and should not be construed as limiting. Various materials listed in the above Table I, for example, may be used.

FIG. 2A shows tracking media formed as flat particles 200a. The media may be formed as one or more larger substrates first which may be crushed and/or pulverized to produce the particles.

FIG. 2B shows tracking media formed as spherical particles 200b. FIG. 2C shows tracking media formed as hemispherical particles 200c. Each of the spherical (or hemispherical) particles may be individually formed or "grown." For instance, a micro-bead technology may be used to grow the spherical particles.

Of course, it will be appreciated that tracking media compositions may be formed in other two-dimensional and three-dimensional particle shapes and forms, as desired. Various processes for depositing multi-layers of the high refractive index material H and the low refractive index material L may be used. For example, photo chemical vapor deposition (PhotoCVD) or electron beam (e-beam) vapor deposition may be used. Of course, other thin-layer material deposition or coating techniques, such as, for instance, liquid (Sol Gel) techniques might also be used.

Figure 3:
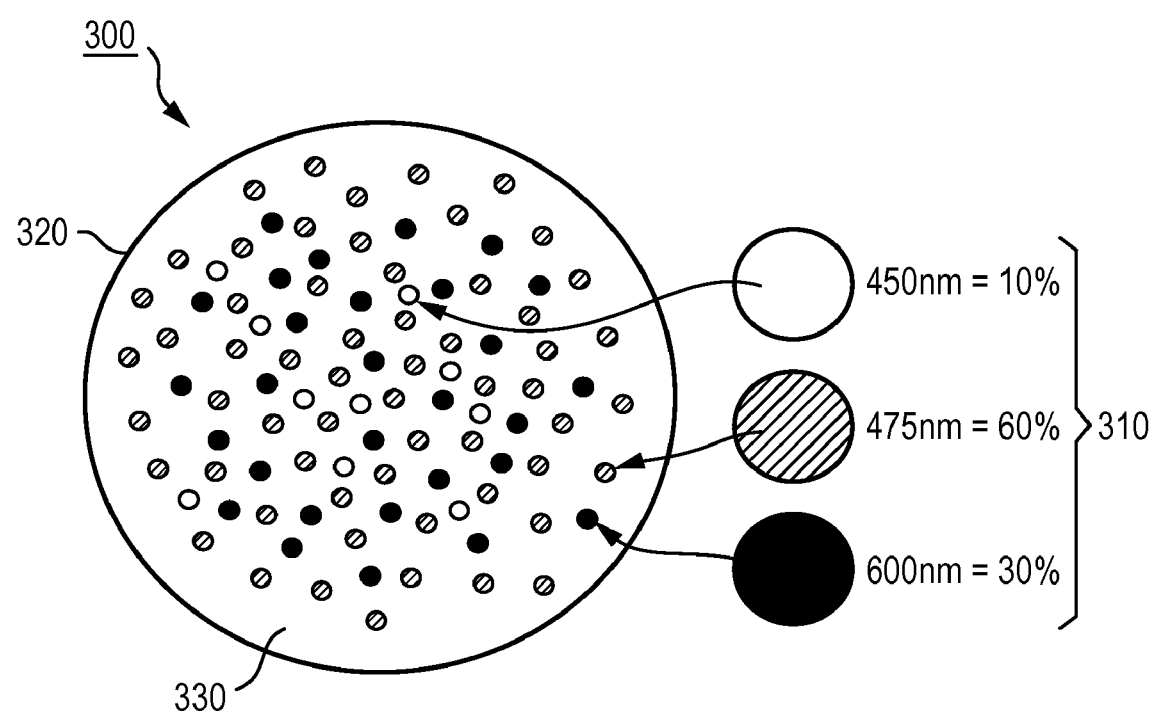
FIG. 3 shows a gel capsule including tracking media in accordance with an embodiment.

FIG. 3 shows gel capsule 300 including tracking media in accordance with an embodiment.

Gel capsule 300 may include a thin shell 320 having a liquid or gel solution 330 including a random distribution of tracking media composition 330 therein. Gel solution 330 may include particles mixed with an adhesive/coating. The adhesive may have a clear, matte finish when applied, for example. Gel capsule 300 may include one or more different tracking media compositions 310 as described above.

In one implementation, thin shell 320 of the capsule 300 may be formed of a polyurethane material or other composition which may be suitable as a projectile, but which is configured to rupture upon impact to apply the composition onto a target. Gel solution 330 may be a liquid polymer or other liquid in which the tracking media 310 is suspended.

Tracking media composition 310 may include a plurality of particles having one or more specific reflective signatures under ambient lighting such as UV, visible, and IR (including near IR and long wave IR). The reflective signature may include one or more specific wavelengths reflected using the ambient lighting.

The reflectance of the tracking media composition may be customizable. Particles having characteristic wavelengths may be formed. As shown, the tracking media composition 310 may be formulated to include 10% of the particles configured to reflect ambient light at about 450 nm ("blue light"); 60% of the particles configured to reflect ambient light at about 475 nm ("green light"); and 30% of the particles configured to reflect ambient light at about 600 nm ("red light"). Percentages may be measured by weight, volume, or number of particles, and the ratios may be of various particles varied as desired or needed.

Various compositions may be formed and identified based on their signature, for example, as follows. Each composition which reflects a different wavelength may be represented by a number (or other indicia). For instance, 400 nm="1," 450 nm="2," 600 nm="3," etc. Mixing all three composition in equal portions may have an identifier (ID) of "123." Mixing 400 nm and 600 nm in a 50/50 mixture may have an ID of "13." Mixing 450 nm and 600 nm in a 50/50 mixture may have an ID of "23." Mixing 400 nm and 450 nm in a 50/50 mixture may have an ID of "12." Accordingly, different compositions of tracking media may be selectively produced and identified for tracking different targets. Lookup table 174 (FIG. 1) may be used to identify a target for a given signature corresponding to a particular tracking media composition. This lookup table may be stored in a database in a memory (not shown).

Figure 4A:
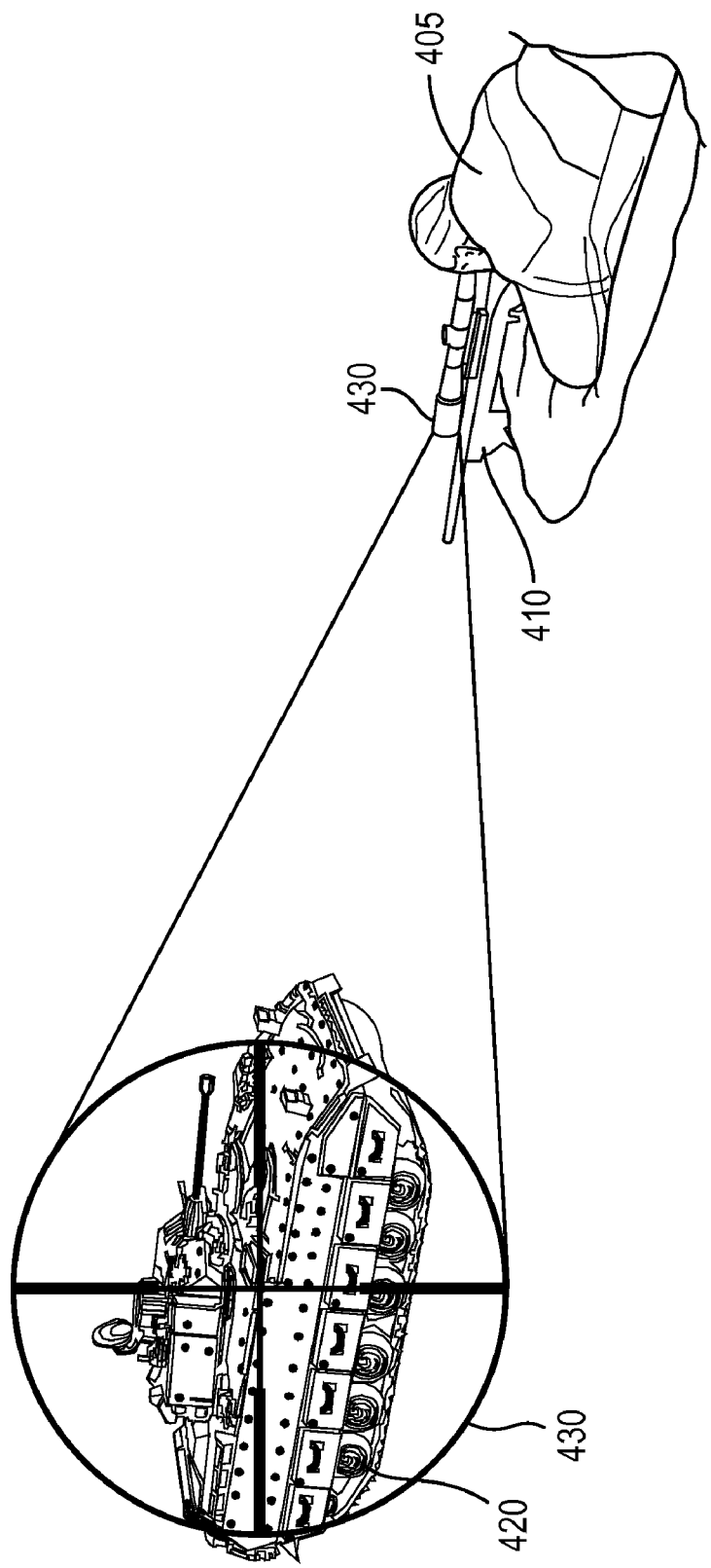
FIGS. 4A and B show exemplary techniques for applying tracking media to a target object in accordance with an embodiment.

FIGS. 4A and B show exemplary techniques for applying tracking media to a target object in accordance with embodiment.

FIG. 4A shows person 405 using rifle 410 to fire gel capsule 300 (FIG. 3). Rifle 410 may be high-powered long-range air rifle, similar to a "paint-ball" gun. The rifle may be aimed at target object 420, in this case, a tank, using a site 430. Upon impact with target object 420, the gel capsule ruptures to apply the composition to the target object. This embodiment may be used for individually tagging an object.

Figure 4B:
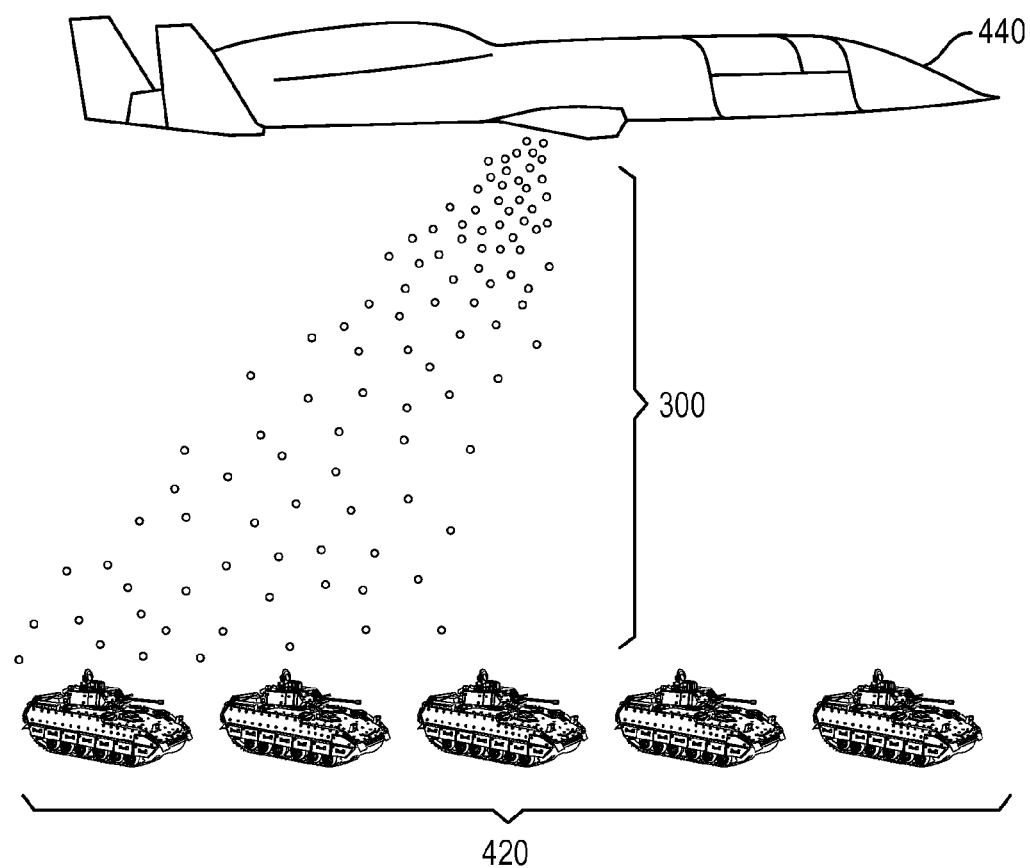

FIG. 4B shows dropping gel capsules 300 from aircraft 440 on target objects 420. Aircraft 440 may include airplanes, helicopters, gliders, UAVs, missiles, balloons, blimps, dirigibles, etc. Upon impact, gel capsules 300 rupture to apply to the composition to target object 420. This embodiment may be effective for mass object tagging. Of course, tracking media may be applied to target objects by other techniques.

The particles forming tracking media may be formed in-situ to have a desired reflectance wavelength signature. Of courses, theoretical and/or trial-by-error fabrication techniques might also be used to produce particles for tracking media having a particular reflectance.

Figure 5:
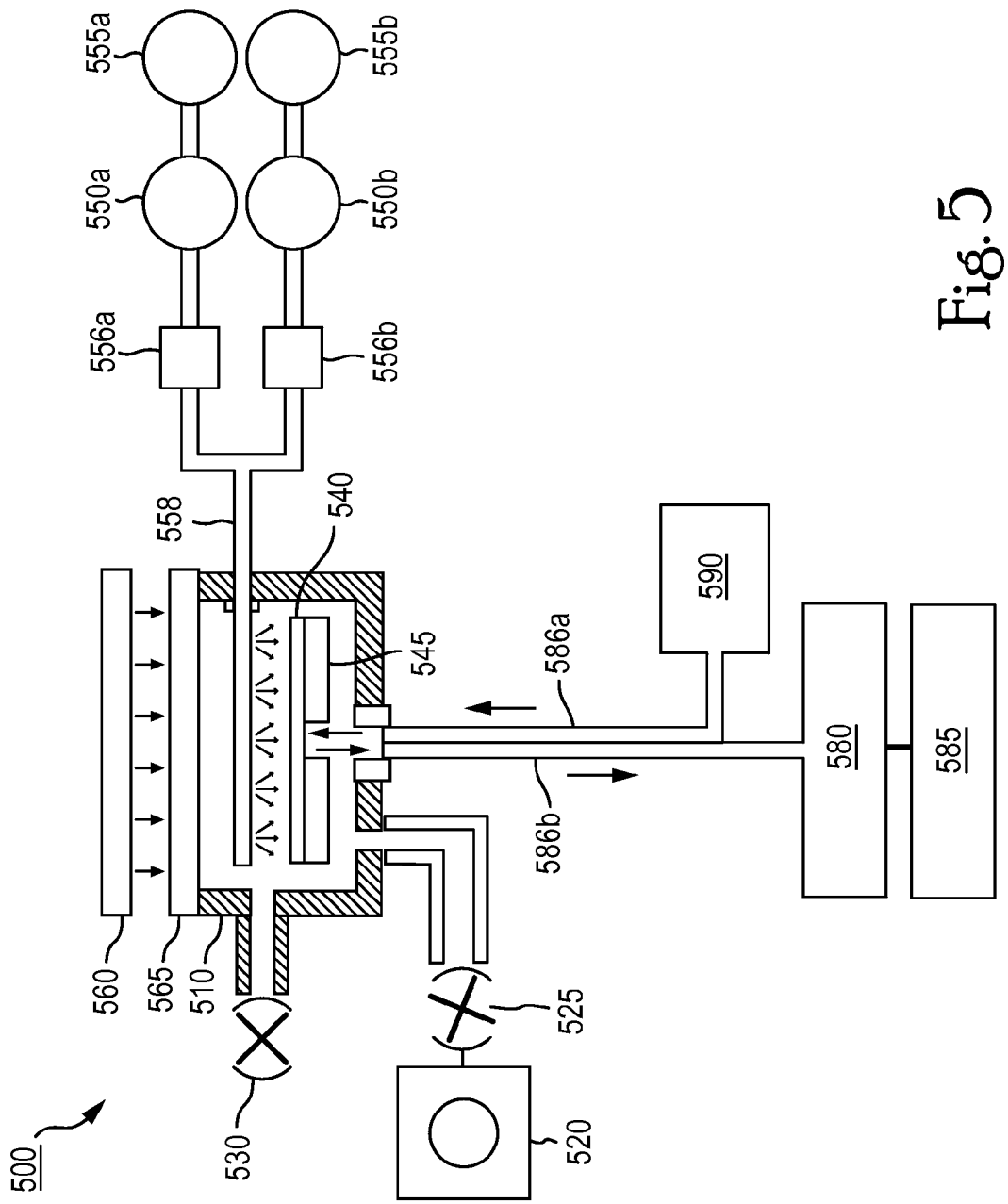
FIGS. 5 and 6 show exemplary deposition apparatuses used for forming the tracking media in accordance with various embodiments, where
Figure 6:
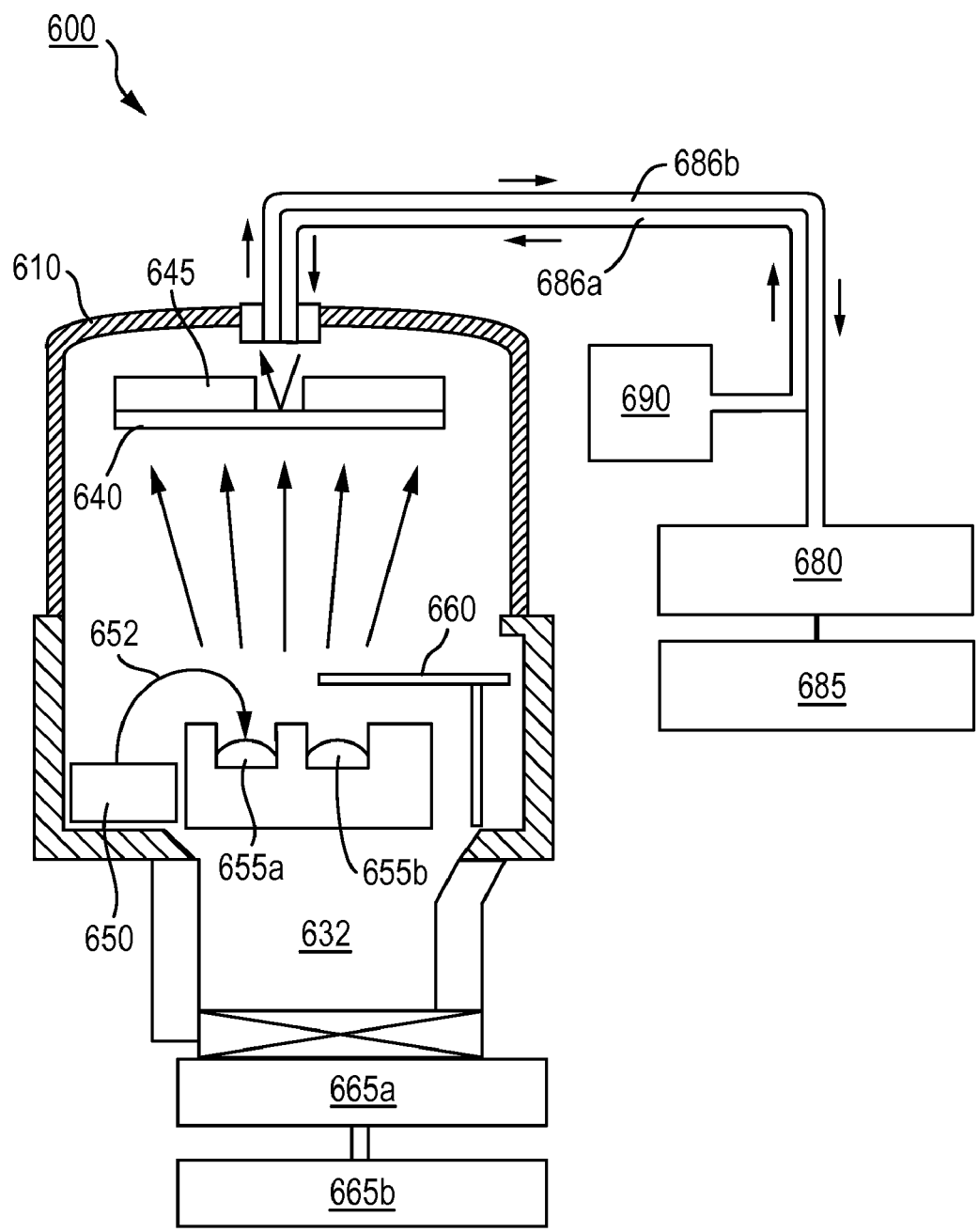

FIGS. 5 and 6 show exemplary deposition apparatuses used for forming the tracking media in accordance with various embodiments.

FIG. 5 shows photo chemical vapor deposition apparatus 500 for forming the tracking media in accordance with embodiment.

Photo chemical vapor deposition apparatus 500 includes a vacuum chamber 510 where deposition occurs. Vacuum pump 520 connected to valve 525 draws the environment inside chamber 510 to a vacuum. Once deposition is performed, gaseous materials remaining in the chamber may be exhausted via exhaust 530. The tracking composition may be formed on substrate 540 which is supported by heating plate 545.

Reactant materials 550a, 550b may be supplied in gaseous form in deposition chamber 510 via manifold 558 that, when reacted, become the high and low effective index materials. For silicon dioxide, silane ($SiH_4$) may be used as a precursor. And, for lead silicate, tetra ethyl lead (($CH_3CH_2$)$_4$Pb) may be used as a precursor. An inert gas 555a, 555b, such as nitrogen ($N_2$), may be used to force the gaseous deposition materials into disposition chamber 510. UV source 560 generates UV radiation (light) which passes through window 565. Radiation impinges upon substrate 540 causing deposition of the reactant materials. Valves and bubblers 556a, 556b are configured to control the flow of the gaseous reactant materials to chamber 510.

On-board spectrometer detector assembly 580 includes a computer control processor 585 and hollow core fiber 586. Hollow core fiber 586a is configured to transfer light from light source 590 to the substrate through the fiber, and hollow core fiber 586b is configured to transfer reflected light from the substrate to spectrometer detector assembly 580. Light source 590 may be a broad-band light source configured to emit light similar to that of ambient lighting and/or other illumination. Based on the measured reflectance, processor 585 controls various aspects of the deposition as discussed below.

FIG. 6 shows electron beam vapor deposition apparatus 600 for forming the tracking media in accordance with an embodiment.

E-beam apparatus 600 includes a vacuum chamber 610 where deposition occurs. The tracking composition may be formed on substrate 640 which is held by holder 645. E-beam source 650 includes high and low refractive index materials 655a, 655b, respectively. A high voltage power source (not shown) coupled to materials 655a, 655b makes them act as the cathode. Shutter 660 may be selectively moved to make the high and low refractive index materials 655a, 655b available for depositing on the substrate 640. Pumps 665a, 665b (e.g., cryo and scroll pumps) may draw the environment inside the chamber 610 down to a vacuum. E-beam source 650 (such as an electron gun) generates electrons. A magnetic field is applied to bend electrons 652 toward the high and low refractive index materials 655a, 655b, which vaporizes the materials. Vaporized deposition materials 655a, 665b then travel toward substrate 640 which acts as the anode. The vaporized deposition materials strike the substrate and cool, thus forming the deposition.

On-board spectrometer detector assembly 680 includes a computer control processor 685 and hollow core fiber 686. Hollow core fiber 686a is configured to transfer light from light source 690 to the substrate through the fiber, and hollow core fiber 686b is configured to transfer reflected light from the substrate to the spectrometer detector assembly 680. Light source 690 may be a broad-band light source configured to emit light similar to that of ambient lighting. Based on the measured reflectance, processor 685 controls various aspects of the deposition, as discussed below.

Figure 7:
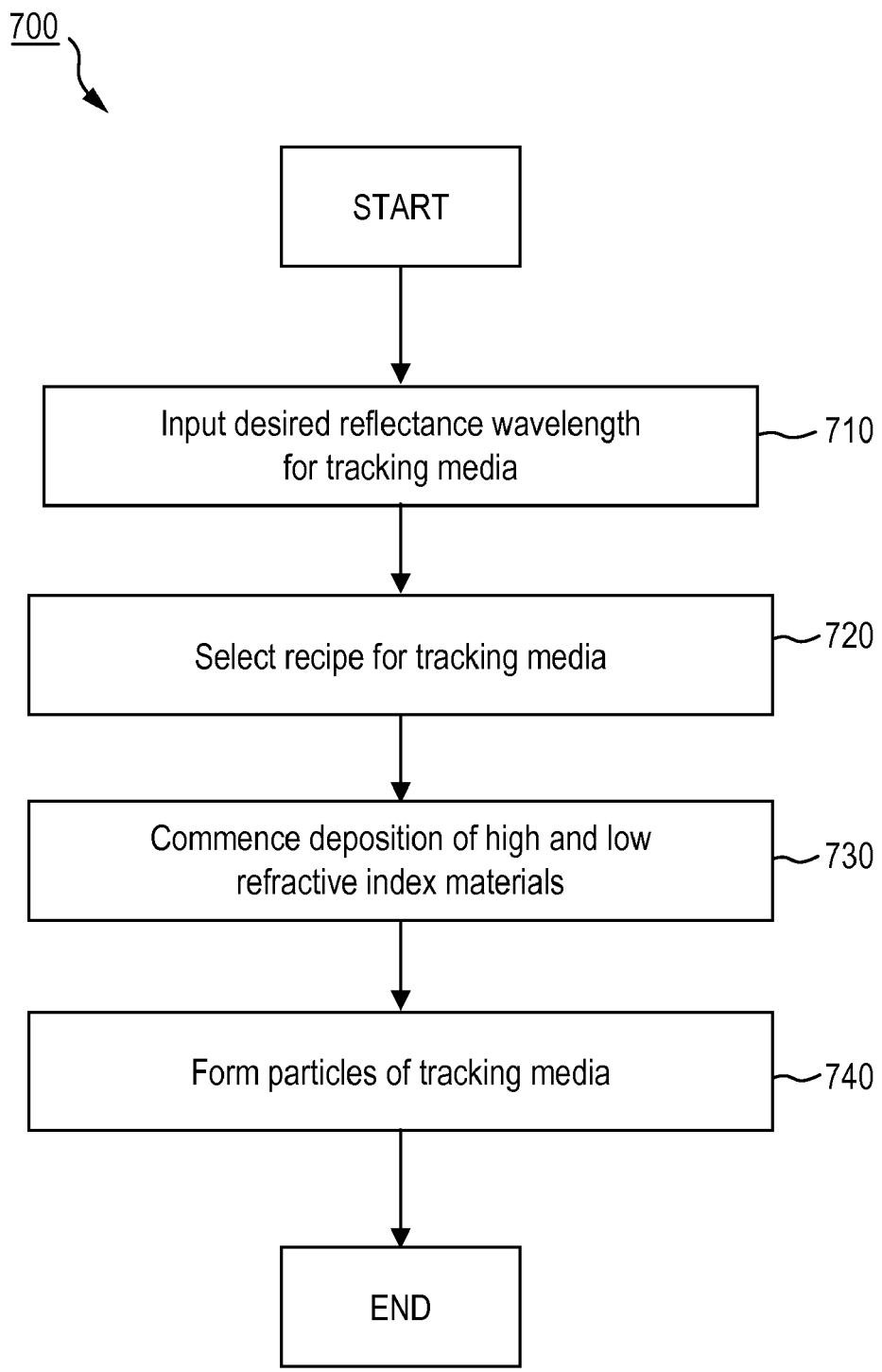
FIG. 7 shows an exemplary in-situ fabrication process for forming tracking media in accordance to an embodiment.

FIG. 7 shows in-situ fabrication process 700 for forming tracking media according to an embodiment.

In step 710, a desired reflectance wavelength is determined for the tracking media under ambient lighting. For instance, an operator can input a desired reflective wavelength value and ambient lighting condition (e.g., sunlight, moon light, or other light source).

In step 720, a recipe is selected for the tracking media having the desired reflectance wavelength. Recipe may include a high and a low refractive index material. The high and low refractive index materials may be selected based on various parameters. These may include, for instance, the particular deposition apparatus/technique being used, the total number of layers, cost of materials, etc.

In step 730, deposition of the high and low refractive index materials may commence. Each layer of the high and low refractive index materials may be approximately the thickness of a ¼ wavelength of the desired reflectance wavelength. During deposition, a detector (such as an on-board spectrometer detector assembly) measures the actually reflectance in substantially real-time.

Figure 8:
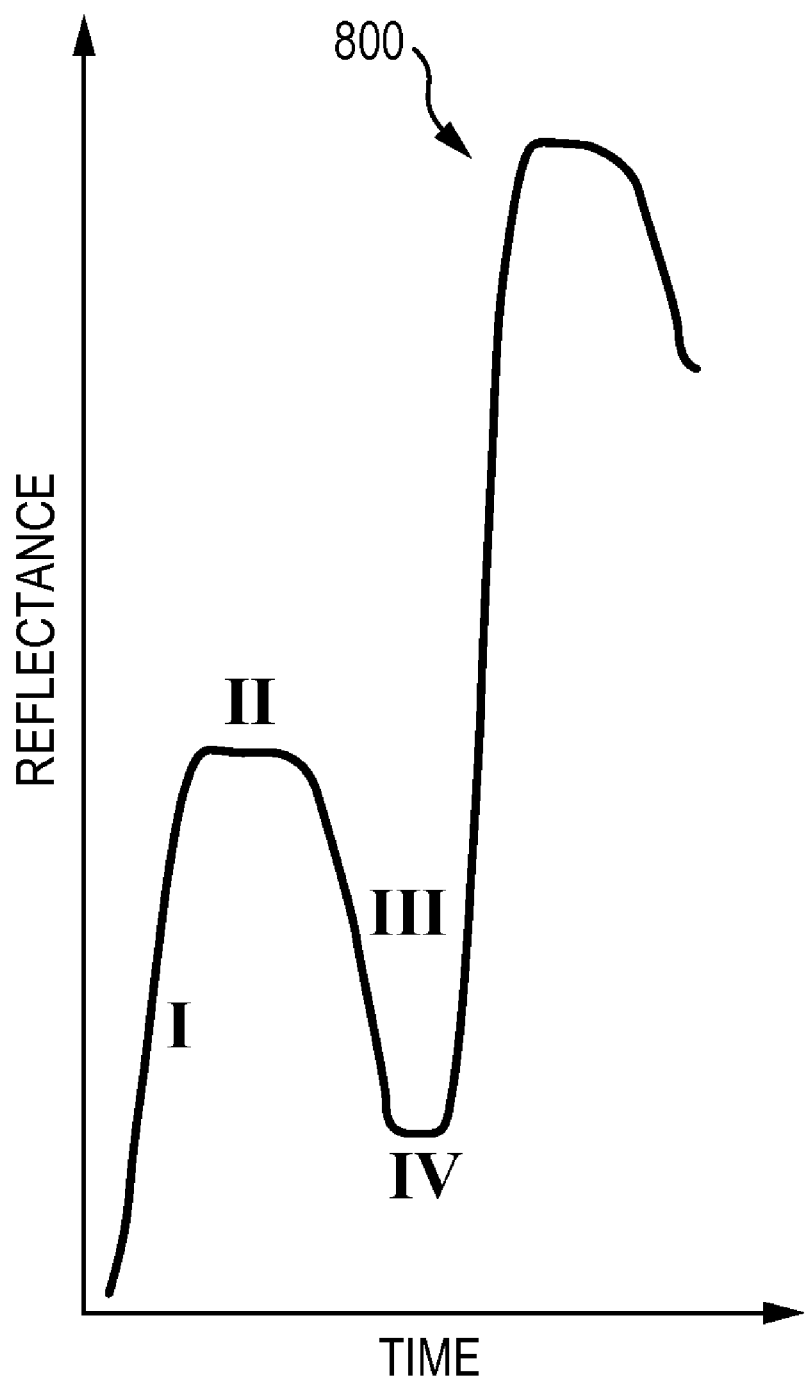
FIG. 8 shows measured reflectance during in-situ deposition process for forming tracking media in accordance to with an embodiment.

The measured reflectance is used to control the deposition process of the substrate. FIG. 8 shows measured reflectance 800 during in-situ deposition process. The processor directs the deposition apparatus depositing the high index material. The measured reflectance will increase during the deposition of the high refractive index material (Region I) until it peaks or saturates (i.e., local maximum reflectance values detected) at about the ¼ wavelength thickness. After the measured reflectance value peaks and levels (Region II), the processor will direct the deposition apparatus to deposit the low index material. The measured reflectance then decreases during the deposition of the low refractive index material (Region III) until it bottoms-out or saturates (i.e., local minimum reflectance value detected) at about the ¼ wavelength thickness (Region IV). The process may repeat, as necessary, until the maximum reflectance, and/or predetermined number of layers, has been reached.

Once formed, in step 740, the tracking media may be formed into particles. For example, the substrate may be crushed or pulverized to produce the tracking media particles of one or more desired sizes.

While photo chemical vapor deposition and electron beam vapor deposition have been described above for forming the tracking media, it will be appreciated that the tracking media may also be formed by other methods such as, for example, sputtering, chemical vapor deposition, physical vapor deposition, or ion milling deposition.

The described embodiments may provide numerous benefits. These may include, for instance, low cost of fabrication, high performance and versatile reflectance, covertness, stealth and customizable detection.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A tracking media comprising:
    a plurality of multi-layer particles including at least one layer of a high refractive index material and at least one layer of a low refractive index material,
    wherein the particles reflect ambient electromagnetic radiation at one or more signature wavelengths; and
    wherein the particles are about $1/16^{th}$ of an inch or less.

2. The tracking media according to claim 1, wherein the one or more signature wavelengths comprises at least two signature wavelengths.

3. The tracking media according to claim 1, wherein the ambient electromagnetic radiation is sunlight, moon light, man-made or artificial lighting.

4. The tracking media according to claim 1, wherein the one or more signature wavelengths are in one or more of the infrared, visible, and ultraviolet spectra.

5. The tracking media according to claim 1, wherein the thickness of each layer of a particle is about ¼ wavelength of a signature wavelength.

6. The tracking media according to claim 1, wherein each particle includes at least 10 layers.

7. The tracking media according to claim 1, wherein the particles are flat, spherical, or hemispherical shaped.

8. The tracking media according to claim 1, wherein the high refractive index material comprises lead silicate ($3PbO_2SiO_2$) and the low refractive index material comprises silicon dioxide ($SiO_2$).

9. A method for detecting a tracking media applied to a target object comprising:
    using a detector configured to detect ambient electromagnetic radiation reflected from the tracking media according to claim 1.

10. The method according to claim 9, further comprising:
    identifying a target based on detecting a reflection at the one or more signature wavelengths of the tracking media.

11. The method according to claim 9, wherein the detector comprises a hyper-spectral imaging (HSI) system configured to detect the reflected ambient electromagnetic radiation.

12. A tracking media comprising:
    a plurality of multi-layer particles including at least one layer of a high refractive index material and at least one layer of a low refractive index material,
    wherein the particles reflect ambient electromagnetic radiation at one or more signature wavelengths; and
    wherein the particles are suspended in an adhesive composition and encapsulated in a thin-shell ball.

13. A method for applying a tracking media comprising:
    applying the tracking media according to claim 12 to a target object.

14. The method according to claim 13, wherein applying the tracking media to the target object comprises:
    firing the tracking media at the target object.

15. The method according to claim 13, wherein applying the tracking media to the target object comprises:
    dropping the tracking media onto the target object.

16. A method for forming the tracking media of claim 12, comprising:
    depositing at least one layer of a high refractive index material and at least one layer of a low refractive index material onto a substrate, and
    forming a plurality of particles from the deposited materials into the tracking media.

17. The method according to claim 16, wherein said depositing comprises:
    performing photo chemical vapor deposition, electron beam vapor deposition, sputtering, chemical vapor deposition, physical vapor deposition, or ion milling deposition.

18. The method according to claim 16, comprising:
    measuring in-situ a reflection from the tracking media during fabrication; and
    controlling, with a processor, the depositing in response to in-situ measurements.

19. The method according to claim 16, further comprising:
    crushing or pulverizing the substrate to form particles of tracking media.

20. The method according to claim 16, further comprising:
    forming particles that are configured to reflect different wavelengths of light.

21. The method according to claim 16, wherein each particle is individually formed.

22. A tracking media comprising:
    a plurality of multi-layer particles including at least one layer of a high refractive index material and at least one layer of a low refractive index material,
    wherein the particles reflect ambient electromagnetic radiation at one or more signature wavelengths; and
    wherein the tracking media is selected from the group consisting of: a gel, a spray, a mist, an aerosol, an adhesive, a coating, a sticker, a paint, a powder, and a flake.

* * * * *